Patented Sept. 29, 1925.

1,555,763

UNITED STATES PATENT OFFICE.

HENRY P. SHOPNECK, OF DORCHESTER, MASSACHUSETTS.

PROCESS OF SEPARATING THE CONSTITUENT MATERIALS OF FIBROUS THERMO-PLASTIC STOCK.

No Drawing. Application filed May 20, 1925. Serial No. 31,708.

*To all whom it may concern:*

Be it known that I, HENRY P. SHOPNECK, a citizen of the United States, residing at Dorchester, county of Suffolk, Commonwealth of Massachusetts, have invented certain new and useful Improvements in Processes of Separating the Constituent Materials of Fibrous Thermoplastic Stock, of which the following is a specification.

In my present invention I contemplate the recovery of various constituents of fibrous thermo-plastic materials and particularly from the scrap from such materials. In certain arts where blanks are cut from sheet stock of this sort, there is a very large amount of scrap that heretofore has been waste or has been only imperfectly salvaged. The difficulty seems to have resided in the inability to separate, without great loss, the thermo-plastic binders from the fibrous body.

In discussing my invention, I shall make particular reference to such a characteristic material utilized in the manufacture of shoes, as illustrative of the practices of my invention and as indicating an art in which there is practical demand for the improvements involved.

Box toe stock comprises a fibrous body in which is a binder such as rosin, bitumen or the like. By reason of their use, the binders in the material are selected with reference to their insolubility in water. By reason of certain physical characteristics which seem to be common to these binders, they tend in certain conditions to powder or to become very finely divided. The problem is to get the fibre free from the gums and other binders and at the same time to save the binders.

In accordance with my invention I beat out mechanically the material to be worked on, such as the scraps of box toe felt. This I preferably effect in the presence of water, reducing the mass to a wet pulp. This pulp comprises the fibres in a free condition and the binder in a fine state of subdivision so that it is in suspension in the water or may be so suspended if the scrap is beaten out dry.

I next separate the water with the suspended thermo-plastic binder from the fibre, as by screening, centrifuging, pressing, etc., leaving the fibre free, after which it may be washed or otherwise treated.

I now heat the water with its suspended thermo-plastic binder. At this stage the matter of temperature becomes important. To recover the binder in a finely divided state it should be heated to about 120° F. or well below the fusing point of the gum or other binder material. In this condition it may be readily filtered out. By heating to a higher temperature, say about 140° F., the binder may be made to coagulate, forming larger particles which are readily separated from the water. At higher temperatures, say 160° F. the binders are more completely coagulated and are easily removed. By effecting coagulation of the binder below the boiling point of the water, the recovered product constitutes a novel gumming substance of unique character. Thus the fibre and the binder are recoverable for the various commercial uses to which they are adapted as for sizes, for paper making, for the making of thermoplastics or for use again in box toe stock.

My invention is adaptable to the recovery of the constituents of many varieties of stocks or materials and may be varied and adapted to the treatment of other fibre materials containing various gums and other binders.

What I therefore claim and desire to secure by Letters Patent is:

1. The method of recovering the constituent materials of fibrous thermo-plastic stock containing a friable thermo-plastic binder consisting in mechanically disintegrating the stock in the presence of water to reduce the binder so as to be suspendable in water, in removing the binder in a state of suspension, from the fibre, in thermally coagulating the binder and in separating it from the water.

2. The method of recovering the constituent materials of fibrous thermo-plastic stock containing a friable thermo-plastic binder consisting in beating out the stock in water to form a pulp with the binder in suspension, in freeing the fibre from the water and in thermally coagulating the binder and in separating it from the water.

3. The method of recovering the constituent materials of fibrous thermo-plastic stock containing a friable thermo-plastic binder, consisting in mechanically disintegrating the stock in the presence of water to reduce the binder to a finely divided state free from the fibre, in washing the binder so divided to separate it from the fibre mass, and in recovering the finely divided binder from the water by filtering.

In testimony whereof I affix my signature.

HENRY P. SHOPNECK.